United States Patent [19]

Bartlett et al.

[11] Patent Number: 4,892,457
[45] Date of Patent: Jan. 9, 1990

[54] APPARATUS FOR MASTERING A ROBOT

[75] Inventors: Donald S. Bartlett, Troy; David I. Freed, Lake Orion; William H. Poynter, Jr., Spitzley, all of Mich.

[73] Assignee: GMF Robotics Corporation, Auburn Hills, Mich.

[21] Appl. No.: 217,304

[22] Filed: Jul. 11, 1988

[51] Int. Cl.[4] ............................................. B25J 9/06
[52] U.S. Cl. .................................. 414/735; 364/513; 901/2; 901/50
[58] Field of Search ........................ 901/2-5, 901/9, 15, 50; 414/680, 735; 73/1 J; 269/309; 280/513, 511; 364/513; 318/568, 568.13, 568.14, 568.1

[56] References Cited

U.S. PATENT DOCUMENTS

| | | | |
|---|---|---|---|
| 2,523,500 | 9/1950 | Davey et al. | 280/513 |
| 4,372,721 | 2/1983 | Harjar | 901/4 X |
| 4,390,172 | 6/1983 | Gotman | 269/309 X |
| 4,523,450 | 6/1985 | Herzog | 73/1 J |
| 4,552,502 | 11/1985 | Hajar | 901/50 X |
| 4,642,781 | 2/1987 | Szonyi | 901/46 X |
| 4,716,350 | 12/1987 | Huang et al. | 364/513 X |

Primary Examiner—Robert J. Spar
Assistant Examiner—Donald W. Underwood
Attorney, Agent, or Firm—Brooks & Kushman

[57] ABSTRACT

An apparatus for mastering a robot includes two balls, each of which has a spherical surface configured to simultaneously contact its respective set of mutually orthogonal locating surfaces of a fixture only when the robot is in a predetermined reference position and orientation. The fixture is mounted on a pedestal of the robot base in a fixed spatial position. One of the balls is mounted for movement with a free end of an outer arm of an arm assembly of the robot. The robot also includes a wrist mechanism. A first end of the wrist mechanism is connected to the free end of the outer arm and a second end of the wrist mechanism is adapted to support a tool. The second ball is mounted for movement with the second end of the wrist mechanism. First and second clamping mechanisms are associated with a fixture and their respective balls for clamping their respective balls so that the generally spherical surfce of each of the balls simultaneously contacts each of the surfaces of its set of locating surfaces to thereby secure the robot in the predetermined spatial position and orientation. Each of the clamping mechanisms includes a circular clamping surface having a center. Each clamping mechanism is supported for pivotal movement on the fixture about a pivot axis offset from its ball's center so that its clamping surface defines an eccentric cam. Preferably, the clamping surface is conical.

16 Claims, 2 Drawing Sheets

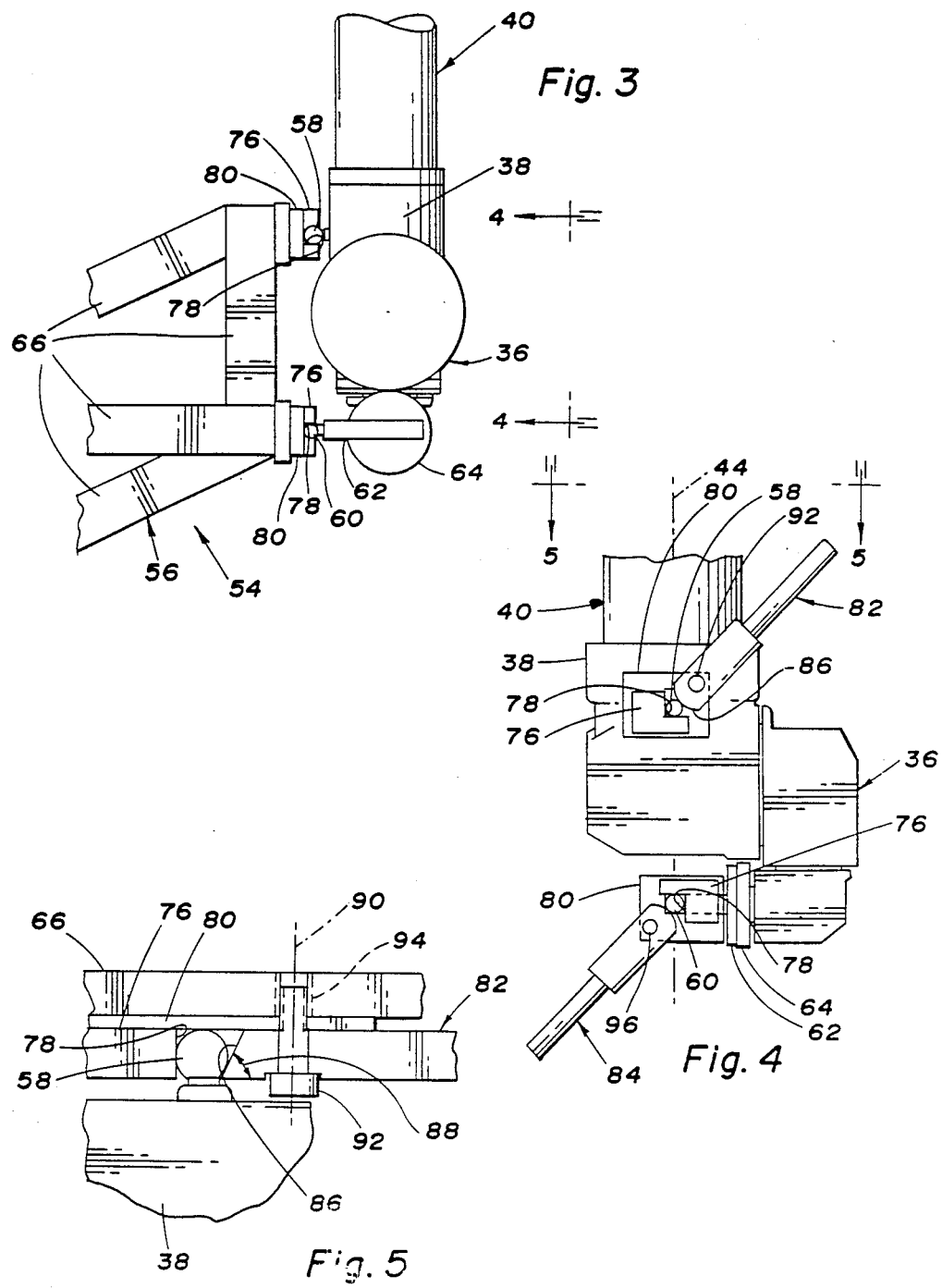

APPARATUS FOR MASTERING A ROBOT

CROSS-REFERENCE TO RELATED APPLICATIONS

This application relates to United States Patent application entitled THREE AXES WRIST MECHANISM, filed Nov. 9, 1987 and having Ser. No. 118,450, which application is hereby expressly incorporated in its entirety by reference.

TECHNICAL FIELD

This invention relates to the calibration apparatus for robots and, in particular, to mastering apparatus for a robot.

BACKGROUND ART

In order for a path taught on one robot to be accurately replayed on a second robot of the same type, the second robot must be "mastered". What mastering does is adjust the joint angle counters of the robot so that when two different robots are in the same position relative to the world (i.e. the same configuration), the joint angle counters will be exactly equal. Thus, when the joint angles obtained from teaching one robot are given to another robot, the second robot will move to the same position as the first.

Mastering is also needed whenever any of the robot's drive train elements are serviced since this changes the relationship between the angle of the motor and the angle of the axis. Mastering resets the joint angle counters to account for this new relationship. Thus, paths taught with the old drive train can be played on the robot with the new drive train.

Another area where mastering is used is in off-line programming where the path of the robot is generated off-line and does not come from points taught on the robot. Mastering is used here to increase the absolute accuracy of the robot so that the robot's path closely follows the path generated off-line.

One way to master a robot is to identically align the output gears of the joints of each robot. This is done by placing a mastering hole in the output gears and pushing a pin through the gears and into a cover or casting. This method requires very accurate placement of the mastering holes in the gears and in the covers or castings. However, this method is still relatively inaccurate. This inaccuracy arises because a relatively small error at the small gear radius turns into a relatively large error at the radius at the end of the arm. Clearance between the pin and the hole is another source of error. Also, since the joint can be moved in either direction before the pin is put in, backlash errors cannot be eliminated. Another disadvantage of this method is that it does not place the robot end effector in a certain position, but rather, it merely places the output gears in a certain position. Any manufacturing errors in the arm itself, such as machining tolerances or extrusion warping turns into mastering errors, since they cannot be accounted for in this type of mastering scheme.

A more accurate way to master a robot is to adjust the joint angle counters so that they agree with the actual angles of the arm. The robot is placed in a certain configuration, then the joint angle counters are set to the angles corresponding to this configuration. This creates a certain reference position relative to the outside world.

Position of the robot during the mastering procedure must be very accurate and very repeatable, since this reference position is compared with all other positions of the robot. This method is much more accurate than the method using mastering holes and gears, since the arm itself is being placed in a repeatable position, not just the output gears. This eliminates some of the arm's manufacturing errors.

To ensure that the robot is in a very accurate and repeatable position, a mastering fixture is usually used. A mastering fixture is a very accurate structure that attaches to the robot base and has some means for placing the robot joints in an accurate position.

One type of mastering fixture uses six dial indicator gauges to measure the position of the robot wrist. A bar or other small structure is attached to the face plate of the robot. The robot operator then moves the robot so that the bar enters the mastering fixture and contacts the gauges. The robot is then moved so that all six gauges read some predetermined nominal value. When this occurs, the robot is in the "mastered position" and the joint angle counters are reset. This method is much more accurate than the scheme which uses holes in the gears but has many disadvantages.

One disadvantage of this method is that it is very slow. Since all six gauges must read their nominal value simultaneously, the robot must be slowly and carefully moved into the correct position. Another disadvantage is that the fixture is not very durable. If it is dropped or hit by the robot, the dial indicators may break or become maladjusted. The six dial indicators also greatly add to the cost of the mastering fixture.

One prior art mastering fixture is indicated in FIGURE and utilizes a series of pegs and V-notches to place a six axis robot into a mastered position. For example, two pegs 10 (only one of which is shown) are attached on opposite sides of a casting 12 of a wrist mechanism, generally indicated at 14. Two pegs 22 are attached to castings 24 and 26 of the wrist mechanism 14 for the last two joints of the wrist mechanism 14. A mastering fixture, generally indicated at 16, has two sets of precision V-notches 18 against which the pegs 10 simultaneously engage. The mastering fixture 16 also includes a pair of precision machined flats 20 which the pegs 22 engage.

An arm 28 of the robot 28 is moved either with a teach pendant or manually, so that the four pegs 10 and 22 contact all of the precision machined surfaces at the same time.

Clamps (not shown) are used to hold the pegs 10 in the V-notches 18 while the two other pegs 22 are moved into position. One of the problems with the mastering fixture 16 as illustrated in FIG. 1 is the amount of precision machining which adds to the cost of the fixture 16. The precision surfaces, peg holes and the pegs themselves must all be accurately machined.

The U.S. Pat. No. to Harjar et al 4,372,721 discloses a calibration fixture including, a stationary member having first, second and third mutually orthogonal flat locating surfaces; and a movable member having first, second and third flat mutually orthogonal locating surfaces configured to simultaneously contact respective first, second and third locating surfaces of the stationary member only when the movable member occupies a predetermined reference spatial position and orientation. Cam positioning means are jointly associated with the movable and stationary members to cam the respective first, second and third locating surfaces simultaneously into contact with each other to locate the movable member at the predetermined reference spatial position and orientation.

The U.S. Pat. No. to Harjar 4,552,502 discloses calibration by locking wrist links relative to each other. Such a calibration scheme does not account for differing link lengths.

The U.S. Pat. No. to Evans et al 4,362,977 discloses a calibration scheme utilizing a multitude of holes and datum surfaces, each one of which is used separately to obtain better absolute accuracy. The robot is moved under computer control to a nominal position and this position is measured using a calibration mask and then recording the errors for use at a later time. These errors are then compensated by software.

The U.S. Pat. No. to Szonyi 4,642,781 discloses a calibration system wherein commanded robot motion is compared to the actual measured motion and any differences are accounted for.

The U.S. Pat. No. to Jacobs et al 4,481,592 discloses the use of a calibration system including a calibration fixture which is attached to a robot base and wrist, for placing the wrist in a desired pose. The calibration fixture utilizes a single wrist attachment point. Actual link lengths are measured as part of the calibration procedure.

SUMMARY OF THE INVENTION

An object of the present invention is to provide apparatus for mastering a robot which places the robot in a very accurate and repeatable position.

Another object of the present invention is to provide apparatus for mastering a robot which is relatively simple to use wherein the actual apparatus is relatively inexpensive by using commonly available parts and a minimal amount of precision machining.

Yet, still another object of the present invention is to provide apparatus for mastering a robot which has no gauges or other moving parts, thereby making the apparatus rugged so that it is able to withstand some abuse without losing accuracy.

In carrying out the above objects and other objects of the present invention, an apparatus for mastering a robot is provided. The robot includes a base and arm assembly supported for movement on the base. The robot, including the arm assembly, is movable to occupy a predetermined reference position and orientation. The apparatus includes a fixture including at least one set of first, second and third mutually converging locating surfaces, mounting means for mounting the fixture on a base in a fixed spatial position and at least one member adapted to be mounted for movement with the arm assembly. The at least one member has a generally spherical surface configured to simultaneously contact each of the surfaces of the at least one set of locating surfaces only when the robot is in the predetermined reference position and orientation.

Preferably, the robot also includes a wrist mechanism supported for movement on the free end of the arm assembly. The wrist mechanism has a first end connected to the free end of the arm assembly and a second end adapted to support a tool. When utilized with the wrist mechanism, the fixture further includes a second set of first, second and third mutually converging locating surfaces and the apparatus also includes a second member adapted to be mounted for movement with the second end of the wrist mechanism. The second member also has a generally spherical surface configured to simultaneously contact each of the surfaces of the second set of locating surfaces only when the robot is in the predetermined reference position and orientation.

Also, preferably, the apparatus further includes first and second clamping mechanisms. Each of the clamping mechanisms is jointly associated with the fixture and its associated member for clamping its respective member so that each generally spherical surface simultaneously contacts each of its respective surfaces of its set of locating surfaces to thereby secure the robot at the predetermined reference position and orientation.

An apparatus for mastering a robot as constructed above is at least as accurate as the prior art mastering fixtures, yet is simpler and substantially less expensive. The position of the robot arm is set directly so there are no errors included due to manufacturing errors, such as encountered in the gear mastering hole procedure.

Other advantages of the present invention will be readily appreciated as the same becomes better understood by reference to the following detailed description when considered in connection with the accompanying drawings.

BRIEF DESCRIPTION OF THE DRAWINGS

FIG. 3 is an enlarged view, partially broken away, of the mastering apparatus;

FIG. 4 is a view of a mastering fixture of the apparatus together with its associated clamping mechanisms taken along lines 4—4 of FIG. 3; and FIG. 5 is an enlarged, partially broken away view, taken along lines 5—5 of FIG. 4 and further illustrating one of the clamping mechanisms of the mastering apparatus.

BEST MODE FOR CARRYING OUT THE INVENTION

Figure 1:
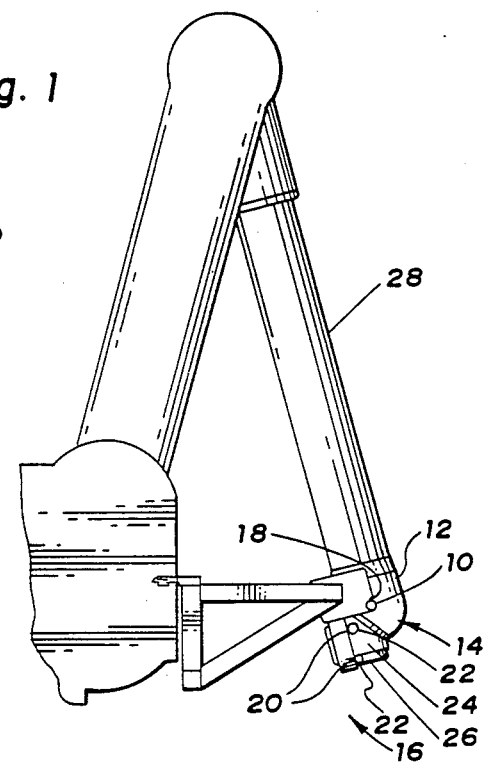
FIG. 1 is a side elevational view, partially broken away, of a prior art mastering apparatus for a robot.
Figure 2:
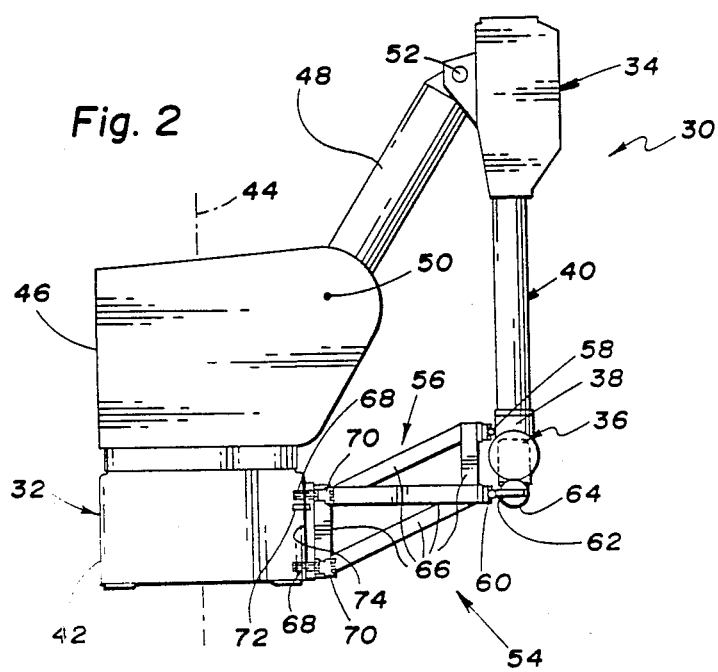
FIG. 2 is a side elevational view of a mastering apparatus constructed in accordance with the present invention and mounted on a robot.

Referring now to FIG. 2, there is illustrated a robot, generally indicated at 30, which is to be calibrated or mastered in accordance with the mastering apparatus constructed in accordance with the present invention. The robot 10 includes a base, generally indicated at 32, and an arm assembly, generally indicated at 34, which is supported for movement on the base 32. A wrist mechanism, generally indicated at 36, is supported for movement on a free end 38 of an outer arm 40 of the arm assembly 34. The wrist mechanism 36 has three axes of rotation as best disclosed in the above-noted patent application.

The base 32 has a central rotary axis 4 and a turret 46 supported on the pedestal 42 for rotation about the rotary axis 44.

The arm assembly 34 also includes an inner arm 48 supported for pivotal movement on the turret 46 about a horizontal pivot axis 50. In turn, the outer arm 40 is supported for pivotal movement on the inner arm 48 about a second pivot axis 52.

Referring now to FIG. 2 in combination with FIG. 3, there is illustrated a mastering apparatus, generally indicated at 54, constructed in accordance with the present invention. The mastering apparatus 54 includes a fixture, generally indicated at 56, and first and second spherical balls or members 58 and 60, which are respectively attached to the free end 38 of the outer arm 40 and to a face plate bracket 62 secured to a face plate 64 of the wrist mechanism 36.

The fixture 56 includes a plurality of interconnected links 66 which are secured to the pedestal 42 by a mounting means or mechanism, including four threaded rods 68 (only two of which are shown) having bar knobs 70 secured thereto for manually securing the fixture 56 to the pedestal 42. Accurate location of the fixture 56 is provided by a pair of accurately located dowels 72 (only one of which is shown) and an accurately machined mounting plate 74 in which the dowels 72 are secured.

As best shown in FIGS. 3 and 4, at the other end of the fixture 56 opposite the robot 30, there are located upper and lower plates 76 in which there have been precision machined upper and lower notches 78. Also located in abutting engagement with the plates 76 are respective precision machined upper and lower flats 80. The plates 76 and the flats 80 are accurately located on the links 66 of the fixture 56 by socket head screws and dowels (not shown).

The plates 76 and their respective flats 80 define first and second sets of first, second and third mutually orthogonal locating surfaces. When, for example, the upper ball 58 simultaneously contacts the surfaces defining the upper notch 78 and the upper flat 80, the upper ball 58 accurately locates the first three axes of the robot 30 (i.e. the axes 44, 50 and 52) since the upper ball 58 is attached to the free end 38 of the outer arm 40.

As previously mentioned, the lower ball 60 is attached at one end of the face plate bracket 62 which, in turn, is accurately attached to the face plate 64 of the wrist mechanism 36. When the upper ball 58 is accurately located in the upper notch 78, the lower ball 60 is used to accurately position the three axes of the wrist 36. When the lower ball 60 simultaneously contacts the two machined surfaces of the lower notch 78 and the machined surface of the lower flat 80, the three joints of the wrist 36 are accurately located.

Referring now to FIGS. 4 and 5, substantially identical upper and lower clamping means or mechanisms, generally indicated at 82 and 84, respectively, are provided for clamping their respectively balls 58 and 60 at their respective locating surfaces defined by the plates 76 and the flats 80 to thereby secure the robot 30 in its predetermined reference position and orientation. Each of the clamping mechanisms 82 and 84 has a circular cam surface 86 which contacts its respective ball 58 and holds it against the precision machined surfaces defined by its notch 78 and flat 80. As illustrated in FIG. 5, the cam surface 86 is conical and has a conical angle 88 to force the ball 58 to contact the surface of its flat 80 as well as the surfaces of its notch 78.

The clamp mechanism 82 pivots about an axis 90 which is offset slightly with respect to the center of the conical cam surface 86, as best shown in FIG. 4. The result is that the clamp mechanism 82 has an eccentric cam which allows the ball 58 to be held firmly in place even if there are variations in the dimensions of the ball 58 or other parts of the mastering apparatus 54.

The clamp mechanism 82 is rotatably fastened to one of the links 66 of the mastering fixture 56 by a shoulder screw 92. The shoulder screw 92 extends through the clamp mechanism 82, the flat 80 and is threaded in a threaded insert 94 disposed within one of the links 66 of the mastering fixture 56. In this way, the threaded insert 94 provides an excellent connection between the shoulder screw 92 and the rest of the mastering fixture 56.

Similarly, the lower clamp mechanism 84 is rotatably fastened to the mastering fixture 56 by a shoulder screw 96 and serves to hold the lower ball 60 in the lower notch 78 define by the lower plate 76 and the lower flat 80.

Preferably, the clamping mechanisms 82 and 84 are designed so that gravity holds the clamping mechanisms 82 and 84 in their clamped positions. The clamping mechanisms 82 and 84 are also held in place in their clamped positions by friction between their respective balls 58 and 60 and their cam surfaces 86.

Preferably, the mastering apparatus 54 is designed so that a line connecting the centers of the upper and lower balls 58 and 60, respectively, is directly in front of and parallel to the center line or rotary axis 44 of the robot 30, as best shown in FIG. 4. This allows the mastering apparatus 54 to be used for a robot with either a right hand or a left hand configuration.

Also, preferably, in the mastering position of the wrist mechanism 36, two of the wrist axes are parallel to each other and perpendicular to a third wrist axis. Furthermore, he face plate bracket 62 is oriented so that the motion of the two parallel axes does not impart the same motion to the lower ball 60. In this way, a single spherical ball, such as the spherical ball 60 may "lock-in" three wrist axes, so that none of the axes move without moving the ball 60 away from its stops defined by the lower flat 80 and the surfaces of the lower notch 78.

This preferred form of having two parallel and one perpendicular axis is also used to position the first three axes of the robot 30, as previously noted.

In the mastering apparatus 54 noted above, both of the mastering balls 58 and 60 contact three surfaces when in the mastered position. Preferably, these surfaces are at right angles to each other. This makes it relatively easy for each of the balls 58 and 60 to contact all three surfaces simultaneously.

Preferably, the distances from the mastering ball 58 and the mastering ball 60 to their respective robot axes are relatively large. This increases the accuracy during mastering, since with a relatively large pivot arm, such as the outer arm 40, a given linear error in the ball position will produce a relatively small angular error in the joint angle.

The advantages accruing to the mastering apparatus 54 described above are numerous. For example, the mastering apparatus 54 provides a very accurate and repeatable position for the robot 30. The position of the arm assembly 34 is set directly so that there are no errors induced due to manufacturing errors, such as occur in the gear mastering hole procedure.

The balls 58 and 60 approach their respective notches 78 from a single direction. Consequently, there are no errors arising from being on different sides of the gear's backlash. The notches 78, the flats 80 and the clamping mechanisms 82 and 84, respectively, are also designed so that their respective balls 58 and 60 make positive contact with all of the stop surfaces, thereby assuring that all of the robot joints are in their proper position and orientation and that there are no errors associated with a clearance between a pin and a hole. There is also only one configuration in which the robot 30 can be placed with respect to the mastering apparatus 54, namely, the predetermined reference position and orientation.

The mastering apparatus 54 is very rugged, since it has no dial indicators or other precision gauges. It is also able to withstand light shock loads, such as being dropped or hit by the arm assembly 34 without loosing accuracy.

The mastering apparatus 54 is well suited for robots that are able to be moved manually. The operator merely grabs the outer arm 40 and the face plate bracket 62 and places the two balls 58 and 60 in their respective notches 78. This is a relatively quick and simple operation.

The mastering apparatus 54 is also very easy and inexpensive to manufacture since there are no precision gauges to add cost. All precision machined surfaces and holes lie in parallel and perpendicular planes. There are only two precision notches 78 to make, rather than a large number of such notches. These precision notches 78 are also located on small, easily-made details which may be doweled into the mastering fixture 56. The two mastering balls 58 and 60 are easily made from inexpensive and readily available construction balls.

Also, the mastering apparatus 54 utilizes clamping mechanisms 82 and 84 which positively locate and secure the balls 58 and 60 in their corresponding notches 78. They prevent the balls 58 and 60 from drifting away from the notches 78 due to vibration or gravity.

The invention has been described in an illustrative manner, and, it is to be understood that, the terminology which has been used is intended to be in the nature of words of description, rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. Apparatus for mastering a robot including a base and an arm assembly supported for movement on the base, the robot, including the arm assembly, being movable to occupy a predetermined reference position and orientation, the apparatus comprising:
    a fixture including at least one set of first, second and third mutually converging locating surfaces wherein the first surface is orthogonal to the second and third surfaces and the second surface is orthogonal to the third surface;
    mounting means for mounting the fixture on the base in a fixed spatial position; and
    at least one member adapted to be mounted for movement with the arm assembly, the at least one member having a generally spherical surface configured to simultaneously contact each of the surfaces of at least one set of locating surfaces only when the robot is in the predetermined reference position and orientation.

2. The apparatus as in claim 1 further comprising at least one clamping means, the at least one clamping means being jointly associated with the fixture and the at least one member for clamping the at least one member so that its generally spherical surface simultaneously contacts each of the surfaces of its set of locating surfaces to thereby secure the robot in the predetermined reference position and orientation.

3. The apparatus as claimed in claim 2 wherein the at least one clamping means includes a circular clamping surface having a center and wherein the at least one clamping means is supported for pivotal movement on the fixture about a pivot axis offset from the center so that the clamping surface defines an eccentric cam.

4. The apparatus as in claim 3 wherein the clamping surface is conical.

5. Apparatus for mastering a robot including a base, an arm assembly supported for movement on the base and a wrist mechanism supported for movement on a free end of the arm assembly, the wrist mechanism having a first end connected to the free end of the arm assembly and a second end adapted to support a tool, the robot, including the arm assembly and the wrsit mechanism being movable to occupy a predetermined reference position and orientation, the apparatus comprising:
    a fixture including first and second sets of first, second and third mutually converging locating surfaces wherein the first surface is orthogonal to the second and third surfaces and the second surface is orthogonal to the third surface;
    mounting means for mounting the fixture on the base in a fixed spatial position; and
    first and second members adapted to be mounted for movement with the free end of the arm assembly and the second end of the wrist mechansim, respectively, each of the members having generally spherical surface configured to simultaneously contact each of the surfaces of its set of locating surface only when the robot is in the predetermined reference position and orientation.

6. The apparatus as in claim 6 further comprising first and second clamping means, each of the clamping means being jointly associated with the fixture and its respective member for clamping its respective member so that each generally spherical surface simultaneously contacts each of its respective surfaces of its set of locating surfaces to thereby secure the robot in the predetermined reference position and orientation.

7. The apparatus as in claim 7 wherein at least one of the clamping means includes a circular clamping surface having a center and wherein the at least one clamping means is supported for, pivotal movement on the fixture about a pivot axis offset from the center so that the clamping surface defines an eccentric cam.

8. The apparatus as in claim 8 wherein the clamping surface is conical.

9. The apparatus as in claim 5 wherein the base includes a pedestal having a rotary axis and a turret supported on the pedestal for rotation about the rotary axis, the mounting means mounting the fixture to the pedestal in the fixed spatial position.

10. The apparatus as in claim 9 wherein each of the first and second members includes a ball having a center, and wherein a line joining the centers of the balls is parallel to the rotary axis in the predetermined reference position and orientation.

11. The apparatus as in claim 9 wherein the arm assembly includes an inner arm supported for pivotal movement on the turret about a first pivot axis and an outer arm supported for pivotal movement on the inner arm about a second pivot axis, and wherein the first member is mounted for movement at the free end of the outer arm, the first member being utilized to accurately locate the rotary and the first and second pivot axes in the predetermined reference position and orientation.

12. The apparatus as claim 11 wherein the wrist mechanism has at least two wrist axes, and wherein the second member is utilized to accurately locate the at least two wrist axes in the predetermined reference position and orientation.

13. The apparatus as claim 5 wherein the first and second surfaces of each set of locating surfaces define a precision machined notch and wherein the third surface of each set of locating surfaces is a precision machined flat.

14. Apparatus for mastering a robot including a base, an arm assembly supported for movement on the base and a wrist mechanism having at least two wrist axes and supported for movement on a free end of the arm assembly, wherein the base includes a pedestal having a rotary axis and a turret supported on the pedestal for rotation about the rotary axis, and wherein the arm assembly includes an inner arm supported for pivotal movement on the turret about a first pivot axis and an outer arm supported for pivotal movement on the inner arm about a second pivot axis, the wrist mechanism having a first end connected to the free end of the outer arm and a second end adapted to support a tool, the robot, including the turret, the arm assembly and the wrist mechanism, being movable to occupy a predetermined reference position and orientation, the apparatus comprising:

a fixture including first and second sets of first, second, and third mutually orthogonal locating surfaces wherein the first surface is orthogonal to the second and third surfaces and the second surface is orthogonal to the third surface;

mounting means for mounting the fixture on the pedestal in a fixed spatial position;

first and second members adapted to be mounted for movement with the free end of the outer arm and the second end of the wrist mechanism, respectively, each of the members including a ball having a generally spherical surface configured to a simultaneously contact each of the surfaces of its set of locating surfaces only when the robot is in the predetermined reference position and orientation, the first member being utilized to accurately locate the rotary and the first and second pivot axes in the predetermined reference position and orientation and the second member being utilized to accurately locate the at least two wrist axes in the predetermined reference position and orientation; and first and second clamping means, each of the clamping means being jointly associated with the fixture and its respective ball for clamping its respective ball so that each generally spherical surface simultaneously contacts each of its respective surfaces of its set of locating surfaces to thereby secure the robot in the predetermined reference position and orientation.

15. The apparatus as claimed in claim 14 wherein at least one of the clamping means includes a circular clamping surface having a center and wherein the at least one clamping means is supported for pivotal movement on the fixture about a pivot axis offset from the center so that the clamping surface defines an eccentric cam.

16. The apparatus as in claim 15 wherein the clamping surface is conical.

* * * * *